United States Patent [19]

Böhm et al.

[11] 4,378,694
[45] Apr. 5, 1983

[54] INSTRUMENT FOR MEASURING THE SPEED AND FUEL CONSUMPTION OF MOTOR VEHICLES

[75] Inventors: Nándor Böhm; János Böhm; Róbert Böhm, all of Budapest, Hungary

[73] Assignee: Kozuti Kozlekedesi Tudomanyos Kutato Intezet, Budapest, Hungary

[21] Appl. No.: 217,786

[22] Filed: Dec. 18, 1980

[51] Int. Cl.³ ............................................. G01F 9/02
[52] U.S. Cl. .................................................... 73/114
[58] Field of Search ......................... 73/114; 235/61 J

[56] References Cited

U.S. PATENT DOCUMENTS

| 1,080,308 | 12/1913 | Stewart | 73/2 |
| 1,401,315 | 12/1921 | Clark | 73/114 |
| 4,247,757 | 1/1981 | Crump, Jr. | 73/114 X |

Primary Examiner—Jerry W. Myracle
Attorney, Agent, or Firm—Karl F. Ross

[57] ABSTRACT

An instrument for continuously indicating the instantaneous rate of fuel consumption (e.g. in terms of liters per 100 kilometers) during operation of a motor vehicle comprises a stationary speed scale juxtaposed with a movable consumption scale, the two scales carrying relatively inverted logarithmic graduations and being swept by a common pointer driven through a gear train from a speedometer biased by a spring of logarithmic characteristic. The movable scale is magnetically entrained, via a friction coupling, by a flowmeter which is thermostatically controlled to take changes in fuel viscosity due to temperature variations into account; the friction coupling can be manually preadjusted in accordance with the specific weight of the fuel. The pointer and the movable scale are carried by two coaxial disks that coact through a differential coupling with a switch which energizes different signal lamps according to whether, at a given speed, the rate of fuel consumption is normal, subnormal or excessive.

17 Claims, 10 Drawing Figures

INSTRUMENT FOR MEASURING THE SPEED AND FUEL CONSUMPTION OF MOTOR VEHICLES

FIELD OF THE INVENTION

Our present invention relates to an instrument for measuring the speed and the fuel consumption of a motor vehicle and, more particularly, for continuously indicating the instantaneous fuel-consumption rate during operation of the vehicle.

BACKGROUND OF THE INVENTION

Known instruments of this general type, to be mounted on the dashboard of a motor vehicle, have stationary scales coacting with respective pointers for respectively indicating speed, consumed fuel and distance traveled. The two last-mentioned data enable a determination of average fuel consumption, e.g. in terms of miles per gallon, to be indicated on a further stationary scale. That average rate of consumption, however, differs from the instant rate which is influenced by a variety of factors including driving speed, road conditions or frequent starts and stops in city traffic.

With the known instruments, accordingly, a driver would not be able to determine whether the vehicle is being handled at any given instant under conditions of low, normal or high fuel consumption.

OBJECTS OF THE INVENTION

The general object of our present invention, therefore, is to provide means in such an instrument for enabling an instantaneous visual determination of the current fuel-consumption rate.

A more particular object is to provide signal-generating means for alerting a driver, acoustically or preferably visually, to the fact that the instantaneous rate of fuel consumption is at a subnormal, a normal or an excessive value.

SUMMARY OF THE INVENTION

An instrument according to our invention comprises a stationary speed scale, logarithmically graduated with first markings representing distance per hour, and a movable consumption scale, logarithmically graduated with second markings representing units of fuel per predetermined distance. The movable scale is disposed on a carrier which is operatively coupled with a flowmeter, the latter being traversed by fuel fed to the motor or engine of the vehicle, and both scales are simultaneously swept by a pointer which is driven by a speedometer having a logarithmically calibrated restoring spring. The two scales are so laid out that, with increasing speed, the pointer sweeps the stationary scale in a direction of increasing markings and the movable scale in a direction of decreasing markings, the latter scale advancing codirectionally with the pointer upon a rise in speed accompanied by an increased fuel flow.

Pursuant to a more particular features of our invention the movable scale is displaceable by the flowmeter via a transmission member such as a toothed wheel which is frictionally coupled with the scale-supporting carrier, the latter being shiftable relatively to that transmission member by manual resetting means serving to vary an initial position of the movable consumption scale in accordance with the specific weight of the fuel used in the vehicle. Such manual resetting may be carried out, with the engine at standstill, whenever the vehicle is being refueled. The carrier and the transmission member are advantageously centered on a common axis about which the two scales are curved. The preferably disk-shaped carrier is angularly entrainable, through a magnetic coupling, by a mobile element in the flowmeter. The disk may be rotatably supported on the flowmeter by first bearing means while a gear forming part of a driving connection between the speedometer and the pointer is supported by second bearing means on the first bearing means with freedom of limited rotation. The two bearing means are advantageously constituted by three stacked elements, namely a boss on the flowmeter, a first clip snap-fitted to that boss by lugs traversing slots in the disk and in the associated toothed wheel, and a second clip snap-fitted to the first clip by lugs traversing slots in the gear driving the pointer.

In accordance with still another feature of our invention, the flowmeter is advantageously provided with thermostatic control means for modifying the displacement of the consumption-scale carrier to compensate for changes in fuel viscosity due to varying temperatures.

A further advantageous feature of our invention resides in the provision of switch means linked with the consumption-scale carrier and the pointer by a differential coupling for the control of signal-generating means indicating significant relative shifts between the movable scale and the pointer. Thus, the movable scale and the pointer will advance in unison when a rise in vehicular speed is accompanied by a proportional increase in fuel flow; any deviation from that proportionality represents a change to a lower or a higher fuel-consumption rate. Though the signal-generating means could be of acoustic type, we prefer to use therefor a first lamp energizable by the switch means in a position indicative of subnormal consumption, a second lamp energizable by the switch means in another limiting position indicative of excessive consumption, and a third lamp energizable by the switch means in an intermediate position representing a normal consumption rate. Thus, for example, excessive consumption may be signaled by a red light whereas green and white lights are used for subnormal and normal rates, respectively.

The relatively inverted logarithmic graduation of the two scales, aside from facilitating their sweep by the same pointer, enables a direct reading of the consumption rate in terms of fuel units per hour. In the embodiment described more particularly hereinafter, the markings of the speed scale range between 5 and 200 km/H while those of the consumption scale range from a fractional value to 100 units of fuel, e.g. liters or kiloponds. In both scales, maximum and minimum values in a ratio of 40:1 lie within an arc of 120°. The position of the pointer relative to the movable scale gives the instantaneous consumption rate as extrapolated to a distance of 100 km; with the two scales closely juxtaposed, the consumption rate can also be read in terms of fuel units per hour at the 100km mark of the speed scale. Naturally, the scale graduations can also be readily converted from metric to other units.

BRIEF DESCRIPTION OF THE DRAWING

The above and other features of our invention will now be described in detail by way of example with reference to the accompanying drawing in which.

SPECIFIC DESCRIPTION

Figure 1:
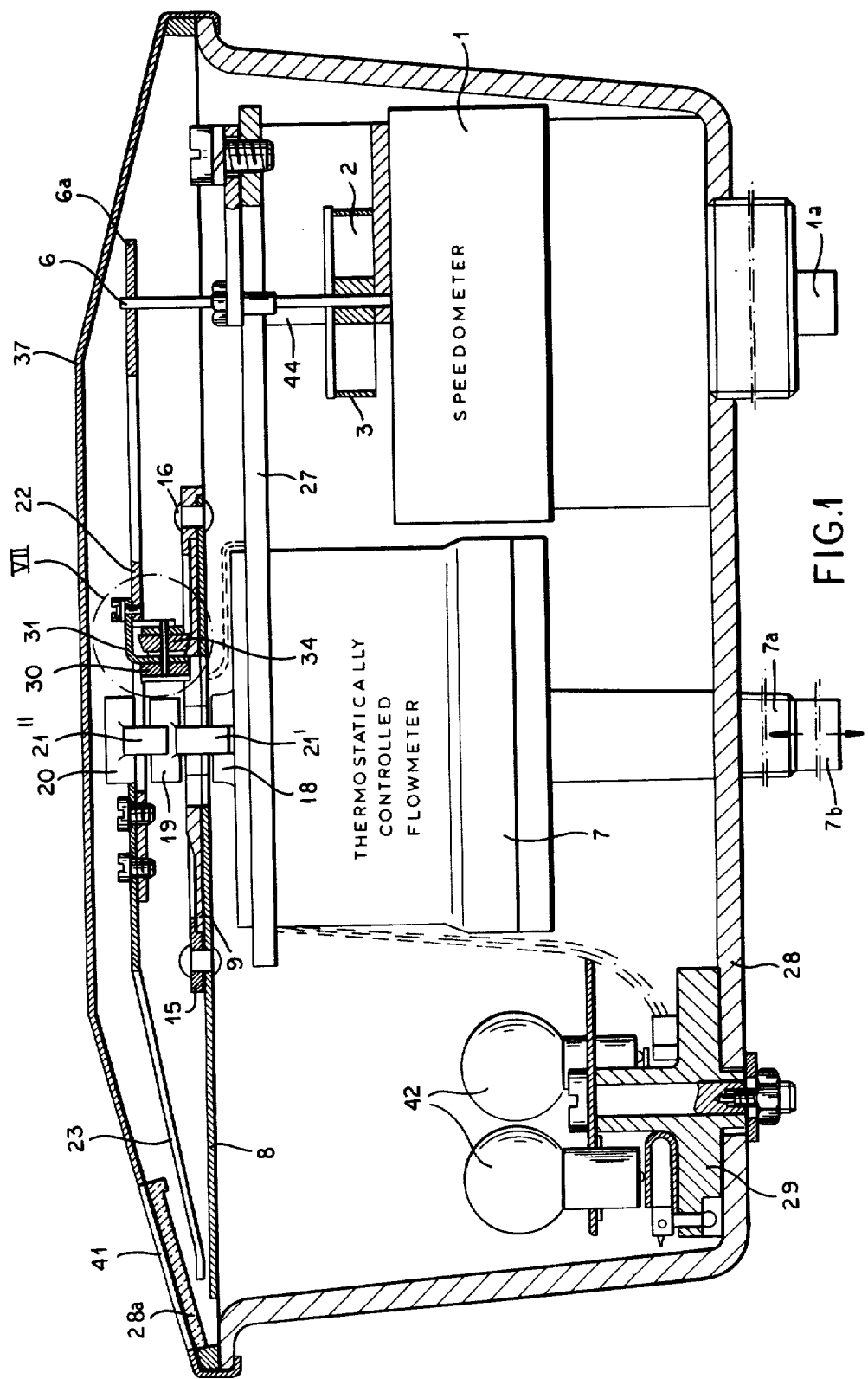
FIG. 1 is an axial sectional view of the housing of an instrument embodying our invention, showing its principal components.
Figure 2:
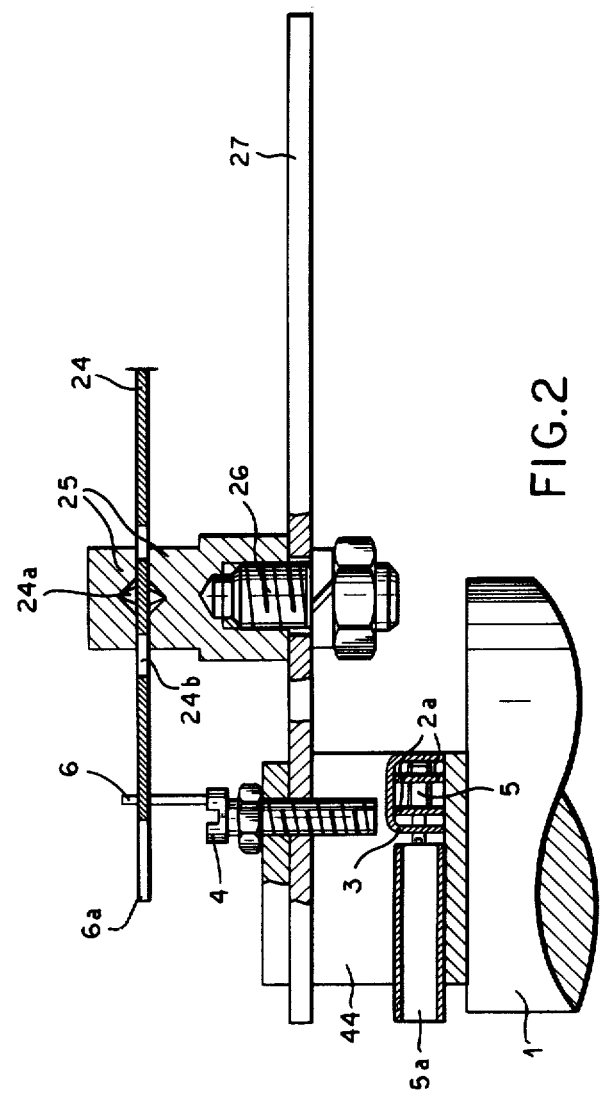
FIG. 2 is a sectional detail view of some of these components.
Figure 3:
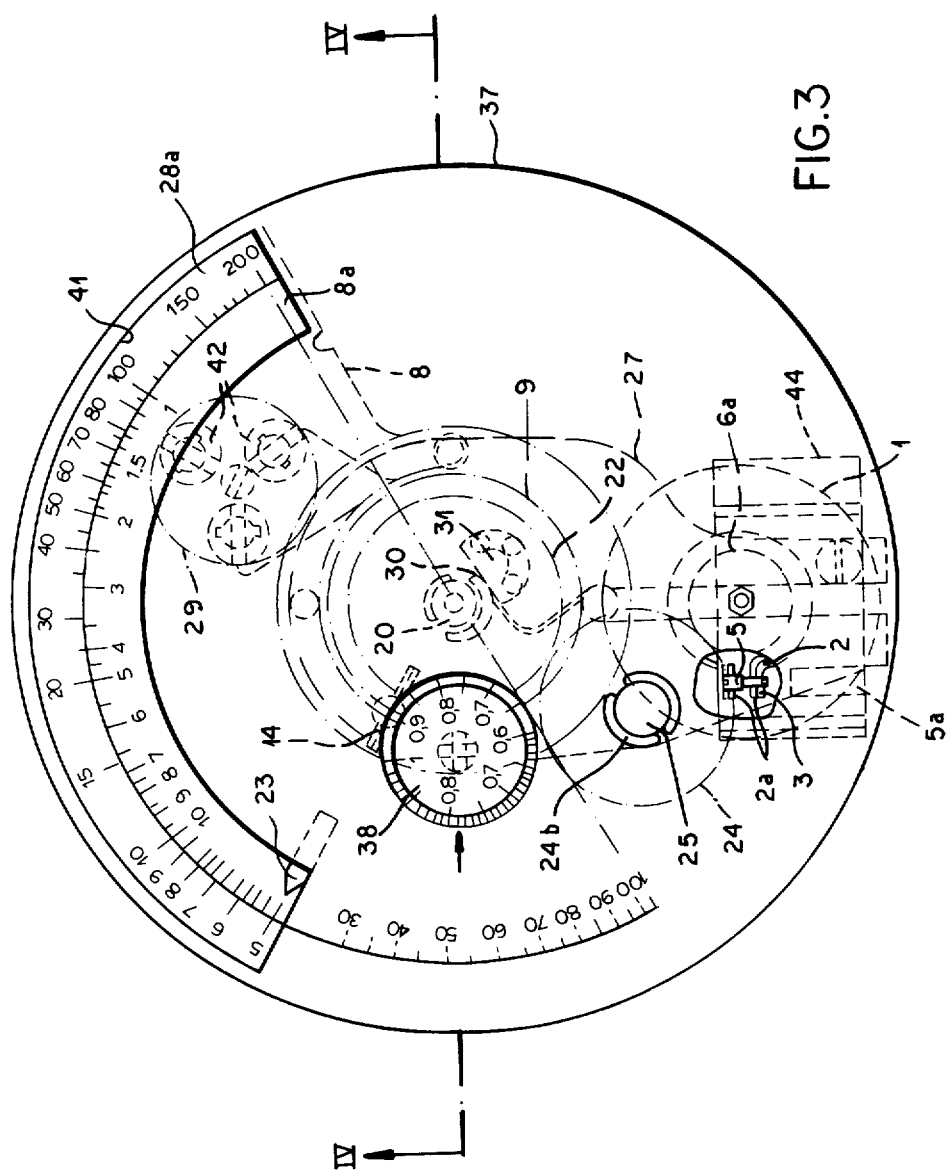
FIG. 3 is a top plan view of the instrument shown in FIG. 1.

The instrument shown in the drawing includes a speedometer 1 as conventionally used in motor vehicles. The speedometer has an input shaft 1a which is driven from the vehicular gear box through the usual flexible connection and is provided with a coil spring 2 of logarithmic characteristic supplying the requisite restoring torque; see FIG. 1. The spring 2 is surrounded by an annular casing 3 of U-shaped profile held in position by a screw 4 on a support block 44. The coil spring 2 can be calibrated, even in the assembled condition of the instrument, by varying its characteristic with the aid of a screw 5 which engages its extremities 2a and is adjustable from the outside by insertion of a screwdriver through a tube 5a (FIGS. 2 and 3). By this means the speedometer can be recalibrated if its magnetic force should weaken in use, thus eliminating the need for remagnetization or replacement of the speedometer spring. A gear 6a is fitted to an output shaft 6 of the speedometer, surrounded by spring 2, and meshes with a larger gear 22 carrying a pointer 23 which sweeps over the markings of a fixed scale 28a and a movable scale 8a, centered against each other on the housing axis as seen in FIG. 3.

Figure 4:
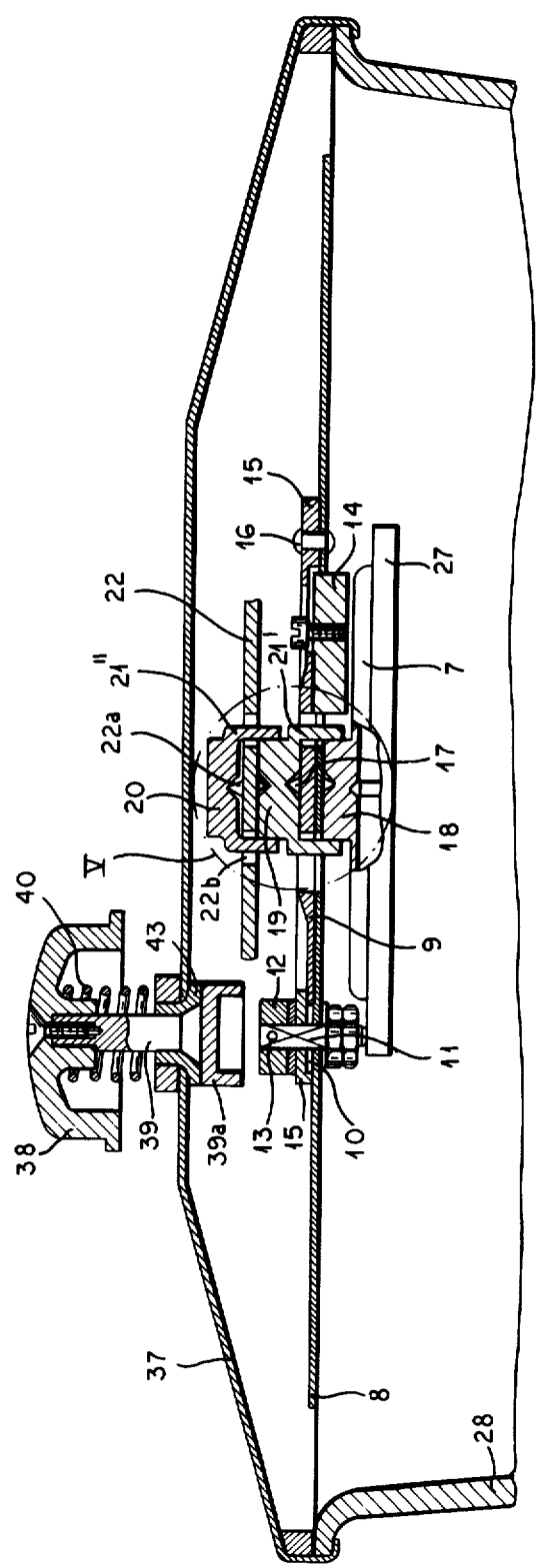
FIG. 4 is a cross-sectional view of the upper part of the instrument, taken on the line IV—IV of FIG. 3 and at right angles to that of FIG. 1.

Another important component of the instrument is a flowmeter 7 measuring the varying amount of fuel consumed by the vehicular engine. A blade (not shown) in the flowmeter is turned through an angle of up to 120° by fluid pressure brought about by a constriction in the cross-section of the flow path along which fuel is conducted from an inlet pipe 7a to an outlet pipe 7b of meter 7. The blade turns to an extent determined by the flow rate of the fuel and magnetically entrains a rotary disk 8 which is frictionally coupled with a toothed wheel or gear 9 coaxial therewith, the latter engaging a smaller gear or pinion 10 with a tooth ratio of 9:1 (FIGS. 3 and 4). Rotary disk 8 carries the logarithmically graduated scale 8a which, on being preset by pinion 10 in accordance with the specific weight of the fuel, accurately shows (by its position relative to pointer 23) the fuel consumption in terms of units of volume or weight, such as liters (l) or kiloponds (kp), that would be used for driving the vehicle over a predetermined distance, here specifically 100 km.

Figure 6:
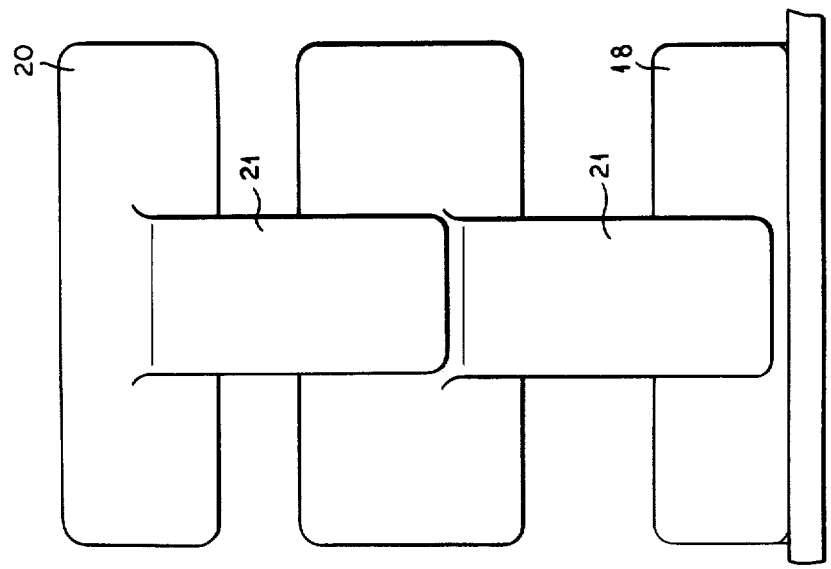
FIG. 6 is a side view of the detail of FIG. 5.
Figure 5:
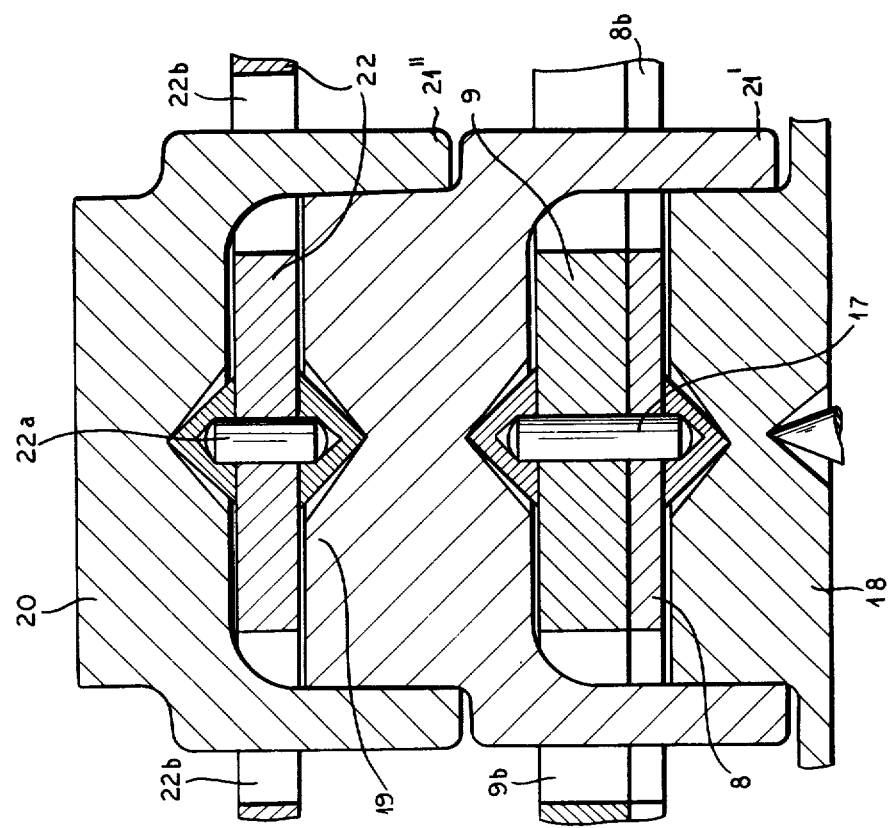
FIG. 5 is an enlarged view of a detail included in a circle V of FIG. 4.
Figure 7:
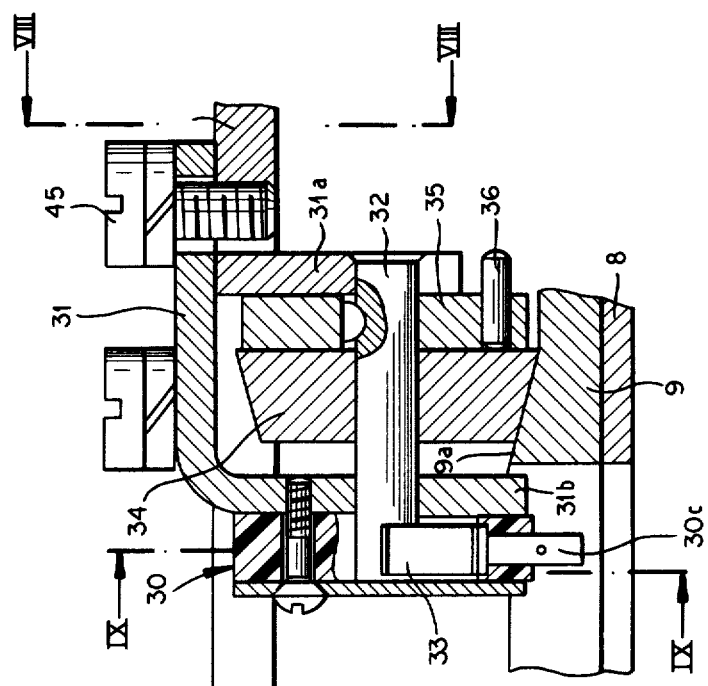
FIG. 7 is an enlarged view of a detail included in a circle VII of FIG. 1.
Figure 8:
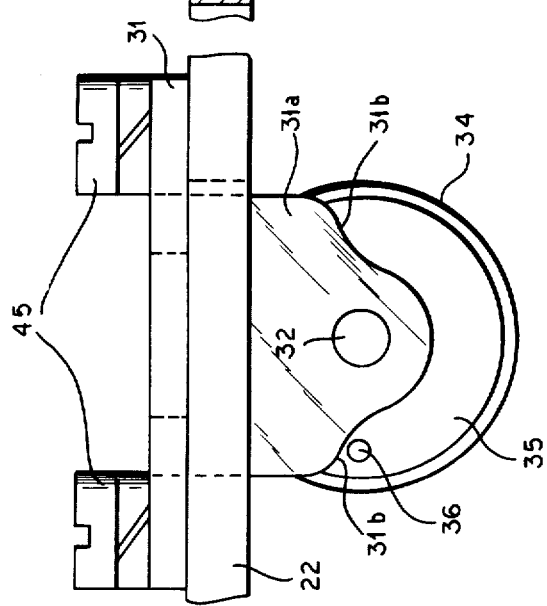
FIG. 8 is an end view seen on the line VIII—VIII of FIG. 7.
Figure 10:
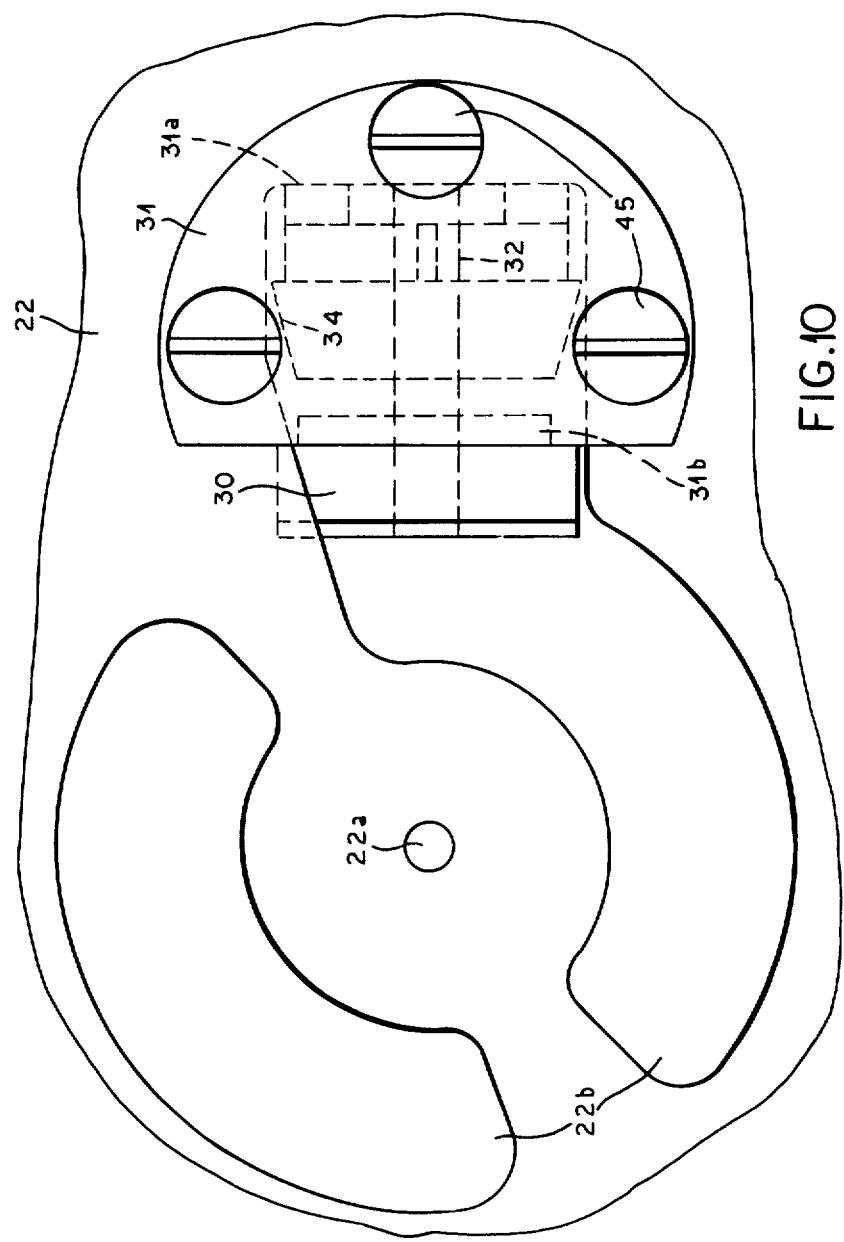
FIG. 10 is a top view of the assembly shown in FIG. 7.
Figure 9:
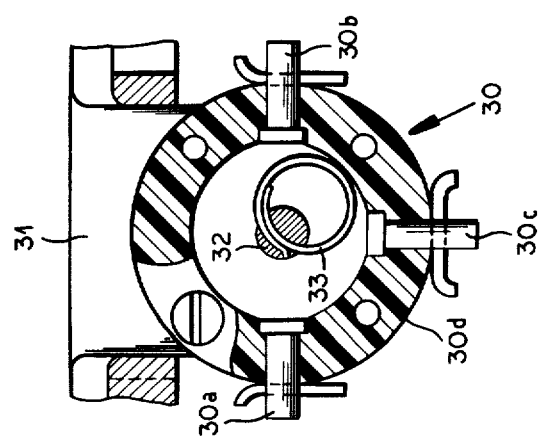
FIG. 9 is a cross-sectional view taken on the line IX—IX of FIG. 7.

Pinion 10 is mounted on a square-profile pin 11 onto which a driving ring 12 is fixed by a bolt 13. Pin 11 is rotatably seated in a hole of disk 8. A mild-steel magnet block 14 is eccentrically secured to gear 9 for angularly displacing same in response to the magnetic lines of force generated in flowmeter 7. Gears 9 and 10 are surrounded from above by a flanged retaining disk 15 overlying the scale disk 8, retaining disk 15 being fixed to the scale disk by rivets 16 in such a way that the surrounded gears 9 and 10 remain rotatable. Disk 8, which in this assembled condition is to be statically balanced, has a tapered shaft 17 received in conical depressions of lower and middle bearing elements 18 and 19, which are part of a stack also including an upper bearing element 20. The lowermost member 18 is a boss on flowmeter 7 whereas the two other elements 19 and 20, between which a tapered shaft 22a of pointer-supporting gear 22 is journaled, are clips each snap-fitted onto the next-lower element by respective lugs 21', 21" as best seen in FIGS. 5 and 6. Lugs 21' traverse arcuate slots 8b, 9b in disk 8 and gear 9 while lugs 21" pass through similar slots 22b of gear 22 (see also FIG. 10) whereby these three coaxial elements can swing through 120°. The gear 22 rotates independently of disk 8 with slight friction around its pointed shaft 22a. The gear 6a on speedometer shaft 6 is connected through another gear 24 with the gear 22 of identical size. The gear 24, having arcuate slots 24b, is journaled by a tapered pin 24a in bearing halves 25; the lower one of these bearing halves is fixed to a stationary mounting plate 27 by a screw 26 (FIG. 2) allowing a relative adjustment of the gears.

Plate 27 is provided with an opening to receive the flowmeter 7 and has a bifurcation by which it is fastened to the block 44 mounted on the speedometer 1 whereby the two meters are held in a fixed relative position within housing 28 to whose bottom they are attached by screws. Furthermore, a lamp socket 29 also fastened to the bottom of instrument housing 28 carries three incandescent lamps 42 of different color, e.g. red, white and green. The energizing leads of the three incandescent lamps, passing below plate 27, are connected to a three-way switch 30 in which these leads are soldered to opposite horizontal terminals 30a and 30b and to a lower intermediate terminal 30c of an insulated distributor ring 30d (see FIGS. 7-10). The switch 30 is mounted on a vertical leg 31c of an angle plate 31 to which a vertical plate 31a is riveted, a shaft 32 being rotatable in bores of plate 31a and leg 31c which pass through one of the slots 22b of gear 22. A contact brush 33 is gripped by a split end of shaft 32 and a beveled friction roller 34 is rotatably mounted between the two bearing-supported extremities of that pin. The larger-diameter face of roller 34 is in frictional contact with a disk 35 which is tightly fitted or keyed onto shaft 32. A stop pin 36 is eccentrically secured to disk 35 and prevents any rotation of shaft 32 beyond an arc of 180° by abutting one of two diametrically opposite flanks 31b on a semicircularly machined bottom part of plate 31a surrounding its journal bore. Angle plate 31 is fixed by screws 45 to the gear 22 which is to be statically balanced in its condition of assembly with switch 30 and pointer 23.

The friction roller 34 engages a sloping surface 9a of the hub of the large gear 9 resting on disk 8. In case of any difference in the forward or backward swings of disk 8 and pointer-carrying gear wheel 22, due to a deviation of the rate of fuel flow from proportionality with the vehicular speed, the beveled roller 34 rotates and frictionally entrains the disk 35 so as to turn the shaft 32. When the stop pin 36 abuts a corresponding flank 31b in one of the extreme rotary positions of shaft 32, contact brush 33 corotating with the shaft closes an energizing circuit for a respective incandescent signal lamp 42, e.g. a green or a red one to indicate subnormal or excessive consumption. In the case of a normal consumption rate, with scale disk 8 and pointer-supporting wheel 22 rotating in unison, as well as upon a reversal of their relative swing, the friction roller 34 stops at least momentarily with pin 36 in an intermediate position in which the brush 33 contacts the terminal 30c to energize the white bulb 42, this being the position illustrated in FIG. 7. The negative branch of the circuit is formed by the instrument or motor body.

The fixed speed scale 28a of 120° arc length, graduated logarithmically in a range of 5-200 km/h, is mounted on the instrument housing 28. The pointer 23 does not indicate vehicular speeds below 5 km/h, because the lugs 21" extending into the slots 22b from bearing element 20 limit the rotation of the wheel 22 to the aforementioned range.

A knob 38 for setting the specific weight of the fuel is mounted on a plate 37, covering the whole instrument, which has a ring-segmental cutout to form a window 41 extending along the arc length of speed scale 28a. Each half of the circumference of knob 38 is provided with scale divisions showing values of specific weight between 0.6 and 1.0 kp/l; see FIGS. 3 and 4.

The scale markings on knob 38 coact with an arrow on plate 37 to register the specific weight of fuel acquired at a filling station on standstill of the motor. The specific weight is set by turning the knob 38 while holding it depressed, against the force of a coil spring 40 surrounding its stem 39, to engage the driving ring 12 rigid with square pin 11 whereby pinion 10 rotates together with gear 9 relatively to disk 8. The latter moves jointly with gear 22 during operation of the motor and travel of the vehicle, the knob 38 having returned to its initial position illustrated in FIG. 4. Stem 39 traverses the plate 37 and, when depressed against the supporting spring 40, fits with its hollow head 39a around the driving ring 12. Thanks to the use of logarithmic graduations of consumption scale 8a, any rotation thus imparted to the disk 8 according to the specific weight of the fuel is translated into a multiplication factor corresponding to the specific weight. During travel, any resetting of pinion 10 and driving ring 12 with resulting maladjustment of disk 8 is prevented by the frictional engagement of gear 9 with disk 8 along their large contact surfaces. Knob 38 is secured in its last rotary position by spring 40 pulling its stem 39 into firm contact with a tapered bushing 43.

Besides the above-described scale-adjusting device 38-40 taking the specific weight of the fuel into account, a thermostat is used in the flowmeter 7 to sense the temperature and viscosity of the fuel conducted in pipes 7a and 7b. This thermostat performs an automatic adjustment, in response to temperature and viscosity variations of the fuel, in a manner causing the spring of the thermostat to vary, with the aid of a control plate not shown, the cross-section of the flow path along the blade rotated by the pressure of the fuel flow. Consequently the blade of the speedometer, and with it the logarithmically graduated scale 8a of disk 8, will turn in proportion to the rate of fuel flow through the thermostatically controlled passage.

A flowmeter of this description is the subject matter of our copending application Ser. No. 217,784 of even date (filed Dec. 18, 1980).

The structural parts of the flowmeter, except for the mild-steel magnet 14, consist of nonferrous and nonmagnetizable materials.

The markings of scales 8a, 28a and the signal lamps 42 are visible through the window 41 in cover plate 37.

The instrument housing 28 can be mounted on the vehicular dashboard in place of the usual speed indicator. Besides the speedometer, an odometer can also be disposed in the instrument housing and can be operated from its driving shaft while being readable through a window in the cover 37.

Any existing, conventional odometer/speedometer combination can be adapted for use with our present instrument by equipping same with an adjustable coil spring of variable tension and logarithmic characteristic serving as the restoring device of the speedometer pointer.

The instrument according to our invention is suitable for reducing the well-known air-polluting effect of motor vehicles. The regulations concerning the reduction of air pollution require very complicated, expensive measuring instruments. Thus, up to now, the equipment could generally be checked only in a manufacturing plate under laboratory conditions whereas the operators of the motor vehicles did not know the extent of air pollution caused by the motor vehicles used by them. The amount of poisonous exhaust gases still containing carbon monoxide and hydrocarbons, because of an oversupply of fuel, can be reduced by selecting with the aid of this new instrument the economical fuel consumption most suitable for the operating conditions of the motor vehicle.

The usefulness of the instrument according to our invention in regard to the national economy is enhanced by economic considerations arising from the continuous rise of the fuel price. A considerable reduction of fuel consumption can be attained by the accurate adjustment of the carburetor, which is easily checked with the instrument. The consumption during idling of the motor can also be checked with the instrument to be read off the scale 8a which, being graduated in terms of liters per 100 km, shows the amount of liters per hour at the 100 km mark of scale 28a.

By indicating an excess fuel consumption through a lighting of the corresponding lamp 42, the instrument calls the attention of the driver to unnoticed faults such as an unreleased handbrake, fuel leakage, ignition failure or other disorders such as malfunction of valves, burning, cessation of cooling-water circulation due to a broken V-belt, and so on.

What we claim is:

1. An instrument for continuously indicating the instantaneous rate of fuel consumption during operation of a motor vehicle equipped with a speedometer and with a flowmeter traversed by fuel fed to the motor, comprising:

a stationary speed scale logarithmically graduated with first markings representing distance per hour;

a movable consumption scale logarithmically graduated with second markings representing units of fuel per predetermined distance, said consumption scale being disposed on a carrier operatively coupled with said flowmeter; and a pointer driven by said speedometer for simultaneously sweeping said speed scale with increasing speed in a direction of increasing markings of said speed scale and decreasing markings of said consumption scale, said consumption scale advancing codirectionally with said pointer upon a rise in speed accompanied by an increased fuel flow, said speedometer being provided with a logarithmically calibrated restoring spring.

2. An instrument as defined in claim 1 wherein said consumption scale is displaceable by said flowmeter by way of a transmission member frictionally coupled with said carrier, further comprising manual resetting means operable to shift said carrier relatively to said transmission member for varying an initial position of said consumption scale in accordance with the specific weight of the fuel.

3. An instrument as defined in claim 2 wherein said carrier and said transmission member are centered on a common axis, said scales being arcuately curved about said axis.

4. An instrument as defined in claim 3 wherein said transmission member is a toothed wheel and said resetting means comprises a knob engageable with a pinion in mesh with said toothed wheel, said pinion being rotatably mounted on an eccentric part of said carrier.

5. An instrument as defined in claim 3 or 4 wherein said flowmeter has a mobile element centered on said axis, said carrier being a disk angularly entrainable about said axis by said mobile element through a magnetic coupling.

6. An instrument as defined in claim 5 wherein said flowmeter forms first bearing means rotatably supporting said disk, further comprising second bearing means supporting a gear on said first bearing means with freedom of limited relative rotation, said gear forming part of a driving connection between said speedometer and said pointer.

7. An instrument as defined in claim 6 wherein said first and second bearing means comprise a boss on said flowmeter, a first clip snap-fitted to said boss by lugs traversing slots in said disk and said toothed wheel, and a second clip snap-fitted to said first clip by lugs traversing slots in said gear.

8. An instrument as defined in claim 1, 2, 3 or 4 wherein said flowmeter is provided with thermostatic control means for modifying the displacement of said carrier to compensate for changes in fuel viscosity due to varying temperatures.

9. An instrument as defined in claim 2, 3 or 4, further comprising switch means linked with said carrier and said pointer by a differential coupling and signal-generating means controlled by said switch means for indicating significant relative shifts between said consumption scale and said pointer.

10. An instrument as defined in claim 9 wherein said differential coupling comprises a roller on a support positively connected with said pointer, said roller being in frictional contact with said transmission member.

11. An instrument as defined in claim 10, further comprising stop means on said roller coacting with said support for limiting the extent of frictional entrainment of said roller by said transmission member.

12. An instrument as defined in claim 11 wherein said signal-generating means comprises a first lamp energizable by said switch means in one limiting position of said roller indicative of subnormal consumption, a second lamp energizable by said switch means in another limiting position of said roller indicative of excessive consumption, and a third lamp energizable by said switch means in an intermediate position of said roller.

13. An instrument as defined in claim 1, 2, 3 or 4 wherein said restoring spring is coiled within an annular casing and is linked with an accessible screw enabling recalibration thereof.

14. An instrument as defined in claim 1, 2, 3 or 4 wherein a housing enclosing said speedometer, said flowmeter, said pointer and said carrier has a cover with a ring-segmental cutout centered on an output shaft of said flowmeter supporting said carrier, said speed scale being visible through said cutout adjacent a portion of said consumption scale with the second markings at an upper and at a lower end of said portion bearing a numerical ratio equaling the numerical ratio of the first markings at opposite ends of said speed scale, thereby enabling a direct reading of consumption rate in terms of units of fuel per hour at a fixed point of said speed scale.

15. An instrument for continuously indicating the instantaneous rate of fuel consumption during operation of a motor vehicle equipped with a speedometer and with a flowmeter traversed by fuel fed to the motor, comprising:
a stationary speed scale graduated with first markings representing distance per hour;
a movable consumption scale graduated with second markings representing units of fuel per predetermined distance;
a disk centered on an axis of said flowmeter for angular entrainment about said axis by being magnetically coupled with a mobile element of said flowmeter, said consumption scale being carried by said disk;
a gear coaxial with said disk positively coupled with an output shaft of said speedometer;
a pointer supported by said gear for simultaneously sweeping said speed scale and said consumption scale;
first bearing means supporting said disk on said flowmeter with freedom of limited relative rotation; and
second bearing means supporting said gear on said first bearing means with freedom of limited relative rotation.

16. An instrument as defined in claim 15 wherein said first bearing means comprises a lower element on said flowmeter and a middle element clipped to said lower element, said second bearing means comprising said middle element and an upper element clipped to said middle element.

17. An instrument as defined in claim 16 wherein said disk and said gear are provided with pointed shafts journaled in conical depressions of the respective elements of said first and second bearing means.

* * * * *